March 11, 1930.   G. A. MONTGOMERY   1,749,981
METHOD OF MAKING DRILL STEMS
Filed April 11, 1927   2 Sheets-Sheet 1
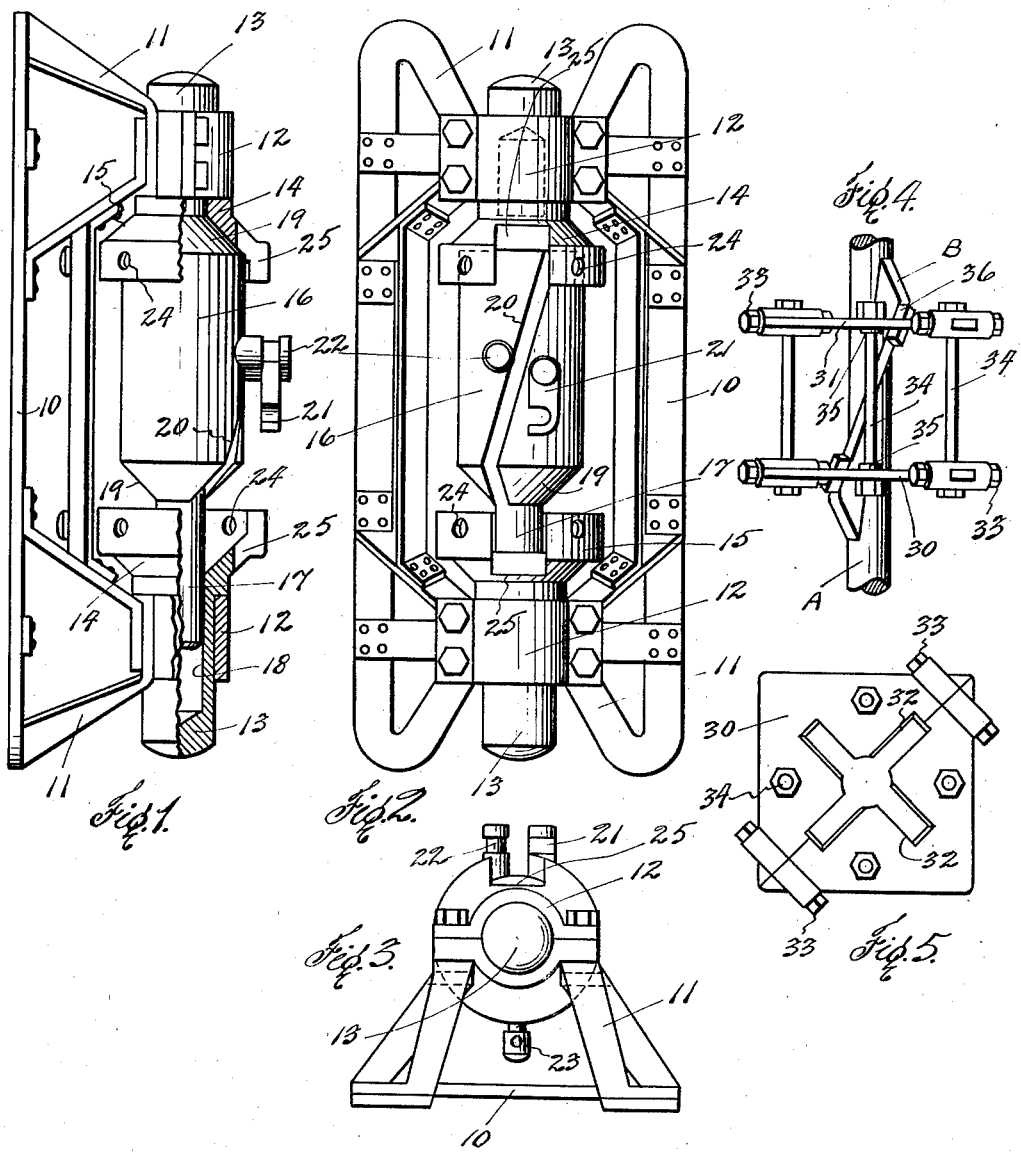
Inventor
G. A. Montgomery
By Jack Ashley
Attorney March 11, 1930.　　G. A. MONTGOMERY　　1,749,981
METHOD OF MAKING DRILL STEMS
Filed April 11, 1927　　2 Sheets-Sheet 2
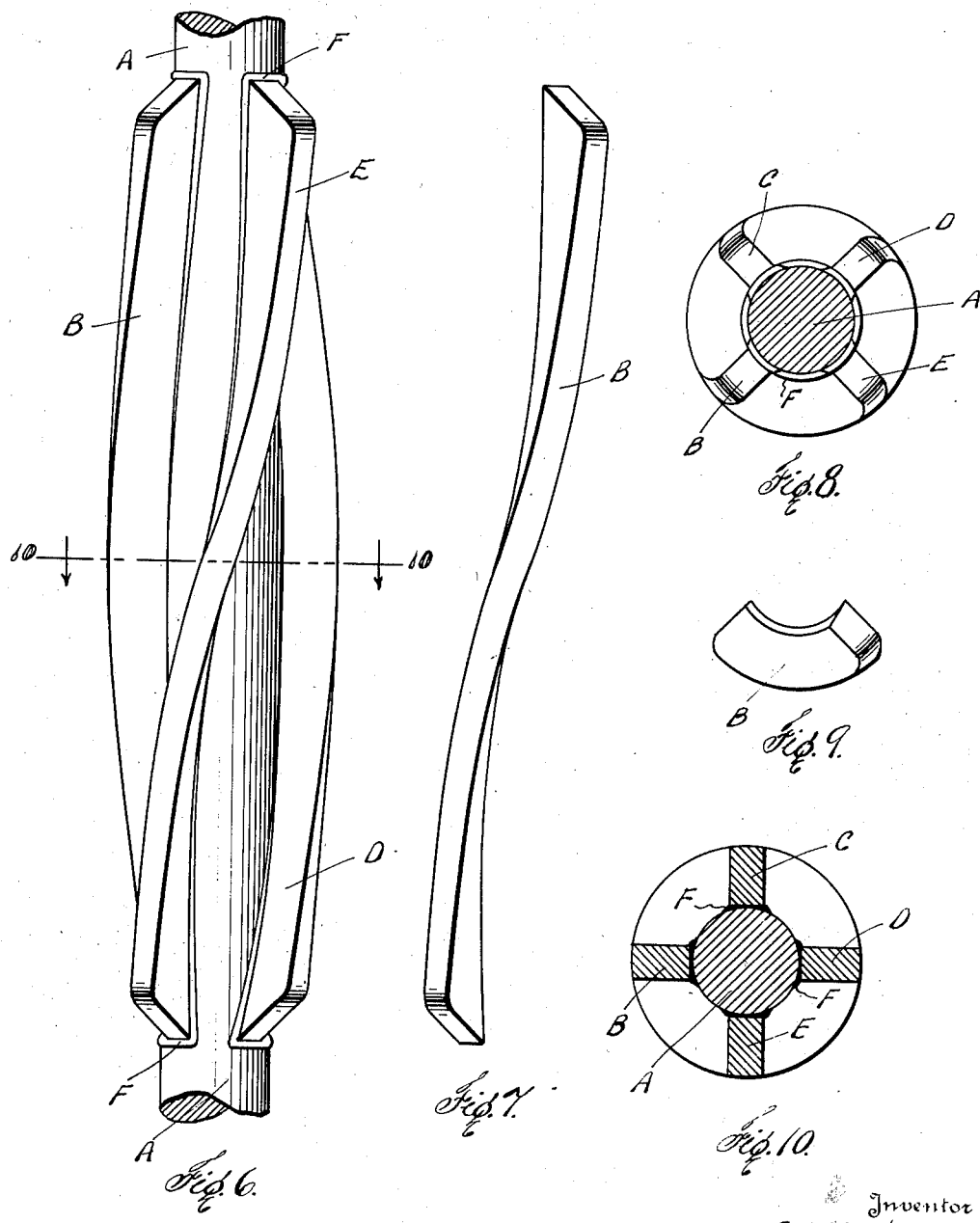

Patented Mar. 11, 1930

1,749,981

UNITED STATES PATENT OFFICE

GUSTAVUS A. MONTGOMERY, OF DALLAS, TEXAS

METHOD OF MAKING DRILL STEMS

Application filed April 11, 1927. Serial No. 182,913.

This invention relates to new and useful improvements in methods of making drill stems for use in drilling wells.

The principal object of the invention is to produce a drill stem by a new and novel method which will avoid the blow holes, expensive machining and other difficulties incidential to casting the stem, as well as overcoming the use of heavy machinery, large furnaces, numerous workmen and expensive machinery, together with the structural imperfections involved in the forging of the stem; such a method resulting in the production of drill stems at a lower cost of manufacture as well as affording a saving in time and material.

A particular object of the invention is to provide a method of making drill stems wherein the blades or wings are previously formed into shape and then welded to the mandrel or core of the stem, while held in position thereon.

An important step in the method resides in the forming of each wing or blade from a blank into the proper shape for welding on the mandrel, whereby machining and finishing operations are made unnecessary.

A construction designed for carrying out the invention will be hereinafter described, together with other features of the invention.

The invention will be more readily understood from a reading of the following specification and by reference to the accompanying drawings in which means for carrying out the wing forming step are illustrated, together with illustrations of products of the method, and wherein:

Fig. 1 is a side view of the wing forming device,

Fig. 2 is a plan view thereof,

Fig. 3 is an end elevation of the same,

Fig. 4 is a plan view of a jig and showing a wing held in place on the mandrel,

Fig. 5 is an end view of the jig,

Fig. 6 is an elevation of a portion of a drill stem showing wings welded thereon in accordance with my method, Fig. 7 is an elevation of one of the wings after it has been formed ready for placing on the mandrel, Fig. 8 is a plan view of the parts shown in Fig. 6, Fig. 9 is a plan view of the wing shown in Fig. 7, and Fig. 10 is a cross-sectional view taken on the line 10—10 of Fig. 6.

As the invention resides primarily in the formation of helical wings or blades as a separate step and the subsequent welding of these blades in proper position and order on the mandrel of the stem, it is immaterial as to the particular devices, apparatuses or structural means employed in carrying out the method. In view of this, the invention is not to be limited to the particular means herein shown and described. The character of metal used is subject to variation, but it is pointed out that the wing blanks may be formed from flat bar stock in an inexpensive manner by selecting bars of the proper dimensions and shearing the blanks therefrom.

Very good results may be secured by shearing the wing blanks from bar stock and cutting their ends at the proper angle for the wing. These blanks are placed in a suitable furnace and heated so as to be workable. For forming the blanks into proper shape, I may use several devices, but that illustrated in Figs. 1, 2 and 3 is very simple and easy to operate. This device includes a base frame 10 formed with standards 11 at each end. The standards support bearing boxes 12. In each bearing box the shank 13 of a forming member 14 is mounted so as to rotate and slide axially.

Each forming member has a conical head or die 15 carried by its shank, as is shown in Figs. 1 and 2. A cylindrical stock 16 is provided with a central arbor 17 on which it is immovably fastened. The ends of the arbor project from the stock to form trunnions which are journaled in the axial bores 18 of the shanks. The stock has its ends 19 beveled to conform to the contour of the dies 15. The head is also provided with a helical slot 20 extending radially to the arbor and conforming to the shape in which it is desired to produce the wing. The slot is made wide enough to permit the flat blank to be dropped edgewise thereinto and to permit the driving of wedges between the wing blank and one edge of said slot. The stock may be formed with a left-hand slot and a right-hand slot, but I have only illustrated one slot.

A wing blank which has been properly heated is placed in the slot 20 and as the stock is slightly shorter than the blank, the ends of the latter will project beyond the ends 19. A clamp hook 21 provided on one side of the slot is swung over the upper edge of the blank and engaged with a shouldered pin 22 on the opposite side of the blank. A wedge is then driven between the clamp hook and the upper edge of said blank. By using suitable sledges and hammers the blank is forced entirely into the slot so that its inner edge will rest on the arbor 17. Wedges are driven between the blank and one edge of the slot and said blank is swaged and made to conform to one side of the slot whereby it is given a helical shape.

In order to insert the blank in the slot 20, the heads 15 are provided with recesses 25 for receiving the projecting ends of the blank when the forming members are rotated to bring said recesses into proper position. After the blank has been swaged to shape the conical heads 15 are moved inwardly so as to ram the ends of the blank, which is still hot, thus causing the inner ends of said blank to be forced into contact with the arbor whereby the inner edge of the wing will properly fit the drill stem mandrel. Set screws 23 (Fig. 3) may be mounted in apertures 24 in the rim of each head and by tightening one of these screws against the blank the latter may be forced inward and prevented from warping.

After the wing has been formed all screws and wedges are removed or loosened, the clamp hook 21 swung to one side and the forming members rotated so as to bring their recesses 25 into registration with the slot 20. With the parts in this position the stock 16 is given a half-revolution so as to permit the finished wing to drop therefrom, the excess width of said slot permitting the wing to readily fall.

I prefer to mount a plurality of wings in spaced order circumferentially of the mandrel and in Fig. 4 have shown one of these wings B held in position on a mandrel A, while in Figs. 8 and 10 I have shown four wings B, C, D, and E in position around the mandrel A. For holding these wings in place for the purpose of welding them on the stem, I may use any suitable means, but have found the jig illustrated in Figs. 4 and 5 to be very practical. This jig consists of transverse end plates 30 and 31 formed with cruciform slots 32 for receiving the wings and the mandrel. Each plate is formed in two sections and secured together by bolts 33. The plates are connected by elongated bolts 34 which are shouldered at 35 so as to hold said plates in their spaced order.

The slot 32 of the plate 30 is displaced circumferentially of the mandrel A with relation to the slot 32 of the plate 31, so that the helical wings will be properly received and held in contact with the mandrel A. After the jig has been clamped on the mandrel A, the wings are inserted in the radial portions of the slots and each wing is secured by a wedge 36 driven between its outer edge and the outer end of that portion of the slot in which it is received. By this means the wings are firmly secured because the wedges are driven in opposite directions and the jig is tightly clamped on the mandrel.

The inner vertical edge of each wing will be substantially flat transversely and will not be concaved to fit the outer contour of the mandrel A, thus when the wing is assembled on the mandrel, longitudinal recesses will be left between the longitudinal edge portions along each side of the wing and the mandrel. In welding a bar of suitable metal, preferably the same as that composing the wing, will be used and flowed into the recesses along each side of each wing as well as across the ends to form a fillet F, as is indicated in Figs. 6, 8 and 10. This procedure will assure an efficient and effective uniting of the wings with the mandrel. It may be necessary to employ artificial heating means to keep the wings hot during the welding operation. In some processes of welding this would be necessary to prevent shrinkage.

It is apparent that this method of forming a drill stem has many advantages and possesses considerable flexibility. If a wing should be broken another wing could be easily welded in its place. The wings may be comparatively short and several groups mounted on the mandrel, thus making for a more easy manufacture. The individual wings may be given any desired pitch or curvature and it is to be understood that while I have shown and described a swaging operation for forming said wings, the same could be die cast or produced in any suitable manner. By the use of this method it is not necessary to machine or finish the wings or carry out other expensive operations.

Various changes in the size and shape of the different parts, as well as modifications and alterations, may be made within the scope of the appended claims.

What I claim as my invention, is:

1. The method of making a well drill stem having helical wings, which consists in shaping the helical wings by a separate operation, then positioning said wings on the outer surface of a drill stem mandrel, and then welding said wings to the mandrel by an interposed body of welding metal.

2. The method of making a well drill stem having helical wings, which consists in swaging heated wing blanks into helical wings, then positioning said wings radially on the outer surface of a drill stem mandrel in spaced order circumferentially of the mandrel, and then welding said wings to the mandrel by an interposed body of welding metal.

3. The method of making a well drill stem having helical wings, which consists in forming a wing blank, then heating said blank, then swaging the heated blank in a suitable forming device to a helical form, then immovably positioning a plurality of said helical wings on the outer surafce of a drill stem mandrel in spaced circumferential order with a straight face of the swings in contact with a curved face of the mandrel, and then welding said wings to the mandrel by an interposed body of metal filling the spaces between said faces.

4. The method of making a well drill stem having helical wings, which consists in forming a wing blank from a stock bar by shearing the same, then heating said blank, then swaging the heated blank in a suitable forming device to a helical form and at the same time ramming the ends of the blank to conform to the diameter of the drill stem mandrel, then assembling a plurality of said helical wings in a jig about a drill stem in cruciform order, and then welding said wings to the mandrel.

5. The method of making a well drill stem which includes separately forming a plurality of elongated helically formed wings, simultaneously supporting all of said wings longitudinally on the outer surface of the stem in equally spaced order, and then welding said wings to the outer surface of said stem on which said wings are so disposed.

6. The method of making a well drill stem which includes separately forming and shaping elongated helical wings having straight inner faces, then applying and holding said wings in spaced order and longitudinally on the peripheral surface of a circular mandrel by a suitable support, then welding said wings to such surface of the mandrel by interposing metal between said faces and surface, and then removing said support.

7. The method of making a well drill stem having helical wings, which consists in forming a wing blank, then heating said blank, then swaging the heated blank in a suitable forming device to a helical form and at the same time ramming the ends of the blank to conform to the diameter of the drill stem mandrel, then assembling a plurality of said helical wings about a drill stem in spaced order, and then welding said wings to the mandrel.

In testimony whereof I affix my signature.
GUSTAVUS A. MONTGOMERY.